(12) United States Patent
Henriksson et al.

(10) Patent No.: US 11,371,184 B2
(45) Date of Patent: Jun. 28, 2022

(54) METHOD FOR RECYCLING BALED WASTE MATERIAL

(71) Applicant: Juno LLC, Atlanta, GA (US)

(72) Inventors: David Christer Henriksson, Marietta, GA (US); Wayne Frederick Winkler, DePere, WI (US); Bradley E. Lucas, Menasha, WI (US)

(73) Assignee: JUNO LLC, Atlanta, GA (US)

( * ) Notice: Subject to any disclaimer, the term of this patent is extended or adjusted under 35 U.S.C. 154(b) by 752 days.

(21) Appl. No.: 14/861,459

(22) Filed: Sep. 22, 2015

(65) Prior Publication Data

US 2016/0083902 A1 Mar. 24, 2016

Related U.S. Application Data

(60) Provisional application No. 62/054,707, filed on Sep. 24, 2014.

(51) Int. Cl.
| | | |
|---|---|---|
| *D21C 5/02* | (2006.01) | |
| *D21B 1/32* | (2006.01) | |
| *D21B 1/34* | (2006.01) | |
| *D21B 1/02* | (2006.01) | |

(52) U.S. Cl.
CPC ............... *D21C 5/02* (2013.01); *D21B 1/026* (2013.01); *D21B 1/32* (2013.01); *D21B 1/34* (2013.01); *D21B 1/345* (2013.01); *Y02W 30/64* (2015.05)

(58) Field of Classification Search
CPC ....................................................... D21B 1/32
See application file for complete search history.

(56) References Cited

U.S. PATENT DOCUMENTS

| | | | |
|---|---|---|---|
| 4,974,781 A | 12/1990 | Placzek | |
| 5,084,135 A | 1/1992 | Brooks et al. | |
| 5,119,994 A | 6/1992 | Placzek | |
| 5,350,630 A * | 9/1994 | Schreiner | B29B 17/0005 428/343 |
| 5,424,033 A | 6/1995 | Roland | |
| 6,032,885 A * | 3/2000 | Ellery | D21B 1/345 241/34 |
| 6,284,094 B1 * | 9/2001 | Carpenter | D21B 1/32 100/1 |
| 6,306,248 B1 * | 10/2001 | Eley | D21B 1/12 162/21 |
| 6,458,240 B1 | 10/2002 | Bouchette et al. | |

(Continued)

OTHER PUBLICATIONS

SL4000, Feb. 2, 2007, Nov. 27, 2013 [archive.org date]; available in 2007 according to MSDS date, NCM Odor control.*

(Continued)

*Primary Examiner* — Anthony Calandra (57) ABSTRACT

A method to facilitate recycling waste material, including waste paper and organic material, comprises the steps of receiving a plurality of plastic-wrapped compressed bales of the waste material at a waste material recycling location from a remote baling location, thereafter introducing the plurality of plastic-wrapped compressed bales into a re-pulping device at the waste material recycling location to form a treated waste material including substantially re-pulped waste paper, and thereafter discharging the treated waste material from the re-pulping device.

31 Claims, 6 Drawing Sheets

(56) References Cited

U.S. PATENT DOCUMENTS

| | | | |
|---|---|---|---|
| 6,506,282 B2* | 1/2003 | Hu | D21C 9/004 |
| | | | 162/5 |
| 6,730,223 B1 | 5/2004 | Anderson et al. | |
| 8,800,898 B2 | 8/2014 | Alford | |
| 8,834,809 B2 | 9/2014 | Michalek et al. | |
| 9,156,069 B2 | 10/2015 | Toll et al. | |
| 9,353,476 B2 | 5/2016 | Henriksson et al. | |
| 2002/0096269 A1 | 7/2002 | Bouchette et al. | |
| 2008/0206094 A1 | 8/2008 | Holloway | |
| 2009/0293426 A1* | 12/2009 | Studer | A01D 87/127 |
| | | | 53/399 |
| 2010/0074798 A1 | 3/2010 | Michalek et al. | |
| 2012/0204483 A1 | 8/2012 | Van den Heuvel et al. | |
| 2013/0309143 A1 | 11/2013 | Michalek et al. | |
| 2016/0097158 A1 | 4/2016 | Henriksson et al. | |

OTHER PUBLICATIONS

D and M Plastics, Polyethylene, downloaded online Dec. 21, 2018 from www. plasticmoulding.ca (Year: 2018).*

PCT/US2015/051459, International Search Report and Written Opinion, dated Sep. 22, 2015 (12 pages).

£ 130M Recycling & Autoclave Ad Biogas Plant For Wakefiled, http://www.waste-management-world.com/articles/2013/01/130m-recycling-and-autoclave . . . (2 pages) printed May 16, 2014.

Rotoclave® Applications, http://www.tempico.com/dynamic.php?pg=Applications . . . (1 page) printed May 16, 2014.

Stephen Barnes, "World First: Autoclaving For Advanced Digestion", http://waste-management-world.com/articles/print/volume-14/issue-1/wmw-special- . . . (5 pages) printed May 16, 2014.

Yamashita, Kyoko et al., "Compositions of Volatile Organic Compounds Emitted from Melted Virgin and Waste Plastic Pellets", Journal of the Air & Waste Management Association, 59:3, (2009), pp. 273-278.

Green Box—100% Reclamation System, http://www.greenboxna.com/index.php (1 page) printed May 16, 2014.

United States Environmental Protection Agency, Decision Document: Approval of Fiberight Municipal Solid Waste Separation Plan, Jun. 2012, 7 pages.

Gershman, Brickner & Bratton, Inc.—2nd Annual Waste Conversion Congress East Coast, Jun. 12-13, 2012, 24 pages.

* cited by examiner

MEMBER FOR RECYCLING BALED WASTE MATERIAL

METHOD FOR RECYCLING BALED WASTE MATERIAL

CROSS-REFERENCE TO RELATED APPLICATIONS

This application claims priority to U.S. Provisional Application No. 62/054,707, filed on Sep. 24, 2014, the disclosure of which is incorporated by reference herein in its entirety

FIELD OF THE INVENTION

The present invention relates generally to recycling waste material including waste paper and organic material for use in recycled paper products. More specifically, this invention relates to a process for recycling waste material in which a substantial amount of time elapses from the time the waste material is collected until the waste material is recycled.

BACKGROUND OF THE INVENTION

Recycled waste paper is a major source of feedstock for the manufacture of paper products. Waste material is often collected at one or more collection sites and delivered to a recycling location at which paper is re-pulped, such as in an autoclave or other re-pulping device, and other components are separated for recycling or disposal. The re-pulped paper can be used to make recycled paper products.

The waste material is sometimes transported to the recycling site and then loaded into the re-pulping device in loose form. Loose waste material can be bulky, so the loose waste material is often baled to reduce the volume of the waste material for more efficient use of transportation, storage, and the autoclave. Waste material, however, often includes odorous organic material that includes odorous compounds or, when stored loose or baled, forms odorous compounds that escape and cause a nuisance or hazard. In addition, such waste material is degraded over time by aerobic degradation which can reduce the value of the waste material as a recyclable material. The odor and aerobic degradation are especially problematic when the loose waste material collection site is remote from the recycling site and substantial time elapses from the time the loose waste material is collected and then recycled. An example of such a situation is when loose waste material is collected from municipal solid waste, industrial solid waste, residential solid waste, or commercial solid waste sites and then transported to a recycling location such as a paper mill.

Accordingly, there is a need for a method for recycling waste material, including waste paper, with reduced odors resulting from aerobic degradation.

SUMMARY OF THE INVENTION

The foregoing need is met by the present invention which provides a method to facilitate recycling waste material, including waste paper and organic material, comprising the steps of receiving a plurality of plastic-wrapped compressed bales of the waste material at a waste material recycling location from a remote baling location, thereafter introducing the plurality of plastic-wrapped compressed bales into a re-pulping device at the waste material recycling location, re-pulping the waste paper in a re-pulping device to form a treated waste material including substantially re-pulped waste paper, and thereafter discharging the treated waste material from the re-pulping device. The recovered paper pulp fraction is suitable as a feedstock in the manufacture of a variety of paper products including but not limited to tissue, towel and packaging products.

These and other objects, features and advantages will become more apparent from the description provided below.

BRIEF DESCRIPTION OF FIGURES

The invention is described in detail below in connection with numerous embodiments and figures. In the Figures.

DETAILED DESCRIPTION OF THE INVENTION

The present invention is described in detail in connection with various embodiments for purposes of illustration only. Parameters of different steps, components, and features of the embodiments are described separately, but may be combined consistently with this description and claims, to enable other embodiments as well to be understood by those skilled in the art. Various terms as used herein are likewise defined in the description which follows. Concentrations in percent are in weight percent unless the context indicates otherwise.

As summarized above, this invention provides a method for recycling waste material, including waste paper, comprising the steps of receiving a plurality of plastic-wrapped compressed bales of the waste material at a waste material recycling location from a remote baling location, thereafter introducing the plurality of plastic-wrapped compressed bales into re-pulping device at the waste material recycling location, re-pulping the waste paper in a re-pulping device to form a treated waste material including substantially re-pulped waste paper, and thereafter discharging the treated waste material from the re-pulping device. The recovered paper pulp fraction is suitable as a feedstock in the manufacture of a variety of paper products including but not limited to paper tissue, towel and packaging products.

The use of plastic-wrapped bales reduces or eliminates odor that is or would otherwise be emitted from baled odorous compound-containing waste material that is treated for recycling a substantial period of time after the waste material has been baled. In some embodiments, the plurality of bales are wrapped in plastic film so as to substantially prevent emission of odor from the odorous compounds in the waste material or substantially stop formation of odor from the odorous compounds in the waste material or both. While not wishing to be bound by theory, it is believed that plastic wrapping the bales impedes or prevents the egress of odor from the bales by functioning as a barrier; however, furthermore, it is believed that aerobic digestion of waste material in the plastic-wrapped bale generates heat and consumes oxygen within the bale and, because the plastic wrap is a barrier, the aerobic digestion self terminates because of the heat and decreased oxygen content in the bale kills the aerobic bacteria in the bale. This, in turn, allows transportation of the plastic-wrapped bales from a remote loose waste material baling location to a waste material recycling location and, optionally, storing the baled waste material over a substantial period of time from when the loose waste material is baled to when the baled waste material is treated in a recycling system autoclave without the waste material causing a nuisance or hazard due to emission of odorous compounds. In addition, the reduced degradation of the waste material preserves more value of the waste material for recycling.

Sterilizing or disinfecting the waste material during re-pulping is sometimes desirable. In some embodiments, the waste material in the plurality of plastic-wrapped compressed bales has a sterilization or disinfection requirement that is less than if the waste material was not in plastic-wrapped compressed bales. This is believed to be due to the above-described self-termination of the aerobic digestion process in the plastic wrapped bales. Thus, in such embodiments, the bacterial load inside the plastic-wrapped bales is less than if the waste material was not in plastic-wrapped compressed bales and the sterilization or disinfection requirements of the re-pulping device may be reduced relative to that of waste material not in plastic-wrapped compressed bales. In addition, in some embodiments, the plurality of plastic-wrapped compressed bales include one or more odor reducing or modifying chemicals added to the waste material. Suitable odor reducing or modifying chemicals include, but are not limited to AirSolution® odor counteractants such as AirSolution #9314 or #115 available from Ecolo Odor Control Technologies, Inc. in Toronto, Ontario and SL-4000 odor control treatment available from NCM Odor Control in South River, N.J., and the like.

According to some embodiments of the invention, the re-pulping device is one that separates the plastic film from the bales during re-pulping such as by subjecting the bales to elevated temperature sufficient to soften or melt the bales or mechanical degradation of the plastic film or both. According to some embodiments of the invention, the re-pulping device is a hydropulper such as a drum pulper or the like. According to some embodiments of the invention, the re-pulping device is an autoclave and the re-pulping is carried out at an elevated processing temperature and an elevated processing pressure.

According to embodiments of the invention, the step of introducing the plurality of plastic-wrapped compressed bales into the re-pulping device comprises introducing the plurality of plastic-wrapped compressed bales into the re-pulping device after the steps of baling the waste material into a plurality of plastic-wrapped compressed bales at the remote baling location and transporting the plastic-wrapped compressed bales from the remote bailing location to the waste material recycling location. According to embodiments of the invention, the step of introducing the plurality of plastic-wrapped compressed bales into the re-pulping device comprises introducing the plurality of plastic-wrapped compressed bales into the re-pulping device at least 1 day after the waste material is baled, or at least 2, 3, 4, 5, 6, or 7 days after the waste material is baled, or from about 2 to about 7 days after the waste material is baled.

According to embodiments of the invention, the waste material which is baled includes odorous compounds. In some embodiments, the waste material comprises organic material that includes odorous compounds or, when stored, is capable of forming odorous compounds. In some embodiments of this invention, sources of odorous compounds include organic material such as food or beverage waste or both. In some embodiments of this invention, sources of odorous compounds include organic material. Organic material means matter composed of organic compounds of or relating to animal or plant constituents or products having a carbon basis including those that come from the remains of dead organisms such as plants and animals and their waste products in the environment. Examples of organic material include food, beverage, yard waste, agricultural waste, human waste, biological waste, health care institution waste such as hospital or clinic waste, hydrocarbons, oils, solvents or industrial chemicals, or the like and combinations thereof.

Figure 1:
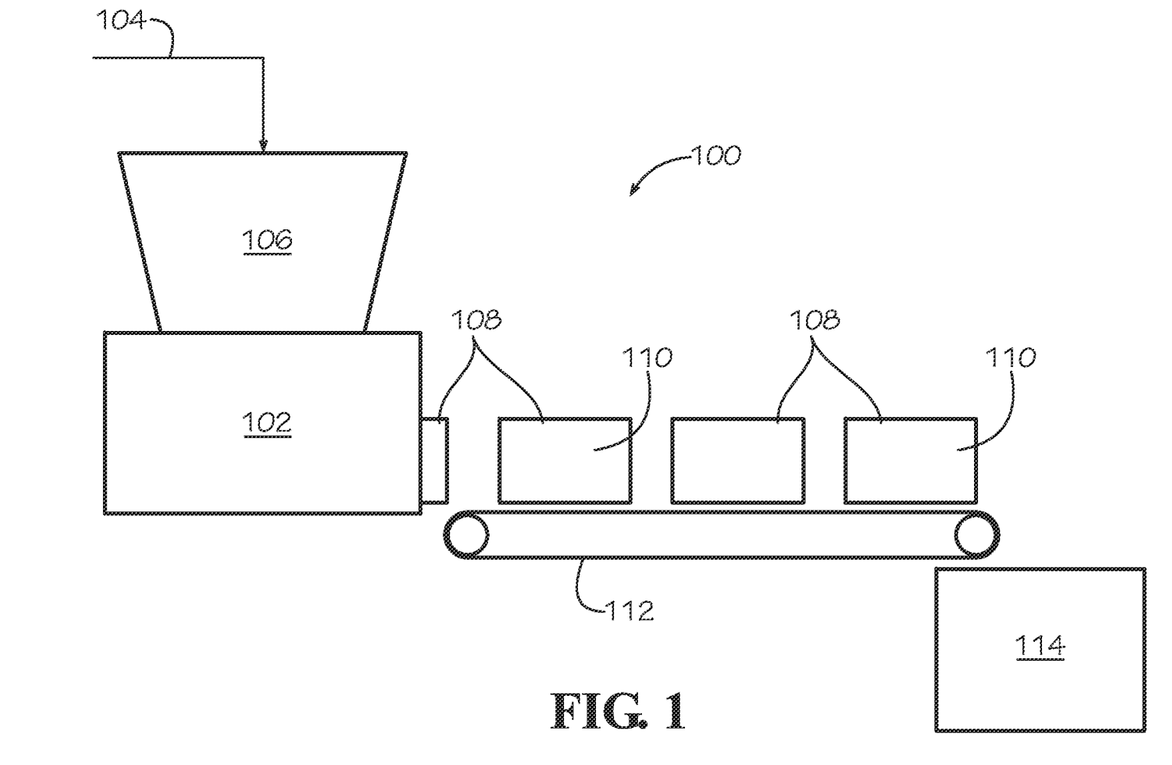
FIG. 1 is a schematic illustration of a waste material baling system according to an embodiment of this invention.

A system 100 for baling waste material in accordance with an embodiment of this invention is illustrated schematically in FIG. 1. This system is located at a loose waste material collection site and includes a baler 102 which receives loose waste material via a loose waste material feeder 104. The loose waste material feeder 104 can be any suitable feeding mechanism such as a mechanized grapple, or conveyor or the like. The loose waste material feeder 104 feeds the loose waste material into a hopper 106 which feeds the loose waste material into the baler 102.

The baler 102 may be any known baler that bales loose waste material into bales wrapped in plastic such as plastic film. The baler 102 produces a plurality of plastic-wrapped bales 108 wrapped in plastic film 110. According to embodiments of the invention, suitable plastic film 110 is removable from the bale 108 by a waste material recycling autoclave, as described in more detail below and functions as a barrier to odorous compounds emitted by the waste material in the bale and the bale 108 is wrapped in the plastic film so as to substantially prevent emission of odor from the odorous compounds in the waste material. According to embodiments of the invention, the bale 108 is wrapped in the plastic film 110 so that the bale is substantially hermetically sealed in the plastic film. According to embodiments of the invention, suitable film includes polyethylene film and the like.

According to embodiments of the invention, the finished plastic-wrapped bales 108 are fed from the baler 102 to a mechanism such as a conveyor 112, or a grapple or the like, from which the bales can be loaded into a shipping container 114 or tractor trailer, or the like, for shipment to a waste material recycling location. According to embodiments of the invention, the plastic wrapped waste material bales can be transported from the remote baling location to the waste material recycling location via truck, rail, barge or the like.

Thus, according to the embodiments in FIG. 1, a method of baling and recycling waste material comprises baling the waste material into a plurality of plastic-wrapped compressed bales 108 at the remote baling location and transporting the plastic-wrapped compressed bales from the remote baling location to a waste material recycling location.

According to embodiments of the invention, the waste material can be municipal solid waste, industrial solid waste, residential solid waste, or commercial solid waste or the like.

The term "municipal solid waste" means all waste materials discarded for disposal by households, including single and multifamily residences, and hotels and motels. The term also includes waste materials generated by commercial, institutional, and industrial sources, to the extent such wastes are essentially the same as waste normally generated by households or were collected and disposed of with other municipal solid waste as part of normal municipal solid waste collection services. Examples of municipal solid waste include food and yard waste, paper, plastics, metals, clothing, appliances, consumer product packaging, disposable diapers, office supplies, cosmetics, glass and metal food containers, and household hazardous waste.

The term "industrial solid waste" means solid wastes generated by manufacturing, educational, health care, correctional and other institutional facilities. Industrial sold waste includes paper, plastic, metal, and organic material as well as other materials.

The term "residential waste" means waste generated by normal activities of households including, but not limited to food waste and other organic material, rubbish such as paper, metal and plastic, ashes, and bulky waste.

The term "commercial solid waste" means all types of solid wastes generated by stores, offices, restaurants, warehouses, and other non-manufacturing activities, excluding residential and industrial wastes and is high in paper and, therefore, paper fiber content as well as polyethylene terephthalate (PET) plastic content relative to municipal solid waste. Commercial solid waste includes plastic and metal and is low in yard waste, polyvinyl chloride (PVC) plastic, construction materials, appliances, disposable diapers, cosmetics, household hazardous waste, and large metal items relative to municipal solid waste.

Commercial solid waste is typically collected at sites such as airports, restaurants, office buildings, educational institutions, and amusement or theme parks. Thus, according to embodiments of this invention, remote baling locations are those that are located a distance from the waste material recycling location that requires transportation of the baled waste material from the remote baling location to the waste material recycling location with a transportation vehicle such as a truck, train, barge, boat or the like. Baling locations on the same site as the waste material recycling location are not remote. For example, baling locations from which the baled waste material can be loaded into the re-pulping device at the waste material recycling location with a conveyor, grapple, fork lift or the like is not remote. Therefore, according to embodiments of this invention, suitable baling locations include, but are not limited to such sites as airports, restaurants, office buildings, educational institutions, and amusement or theme parks and locations at which loose waste material form those sites is collected. According to still other embodiments of this invention, suitable baling locations include, but are not limited to such sites as industrial facilities, health care institutions such as hospitals and clinics, garbage dumps, land-fills, farms, hotels, residences, and locations at which loose waste material form those sites is collected.

Figure 2A:
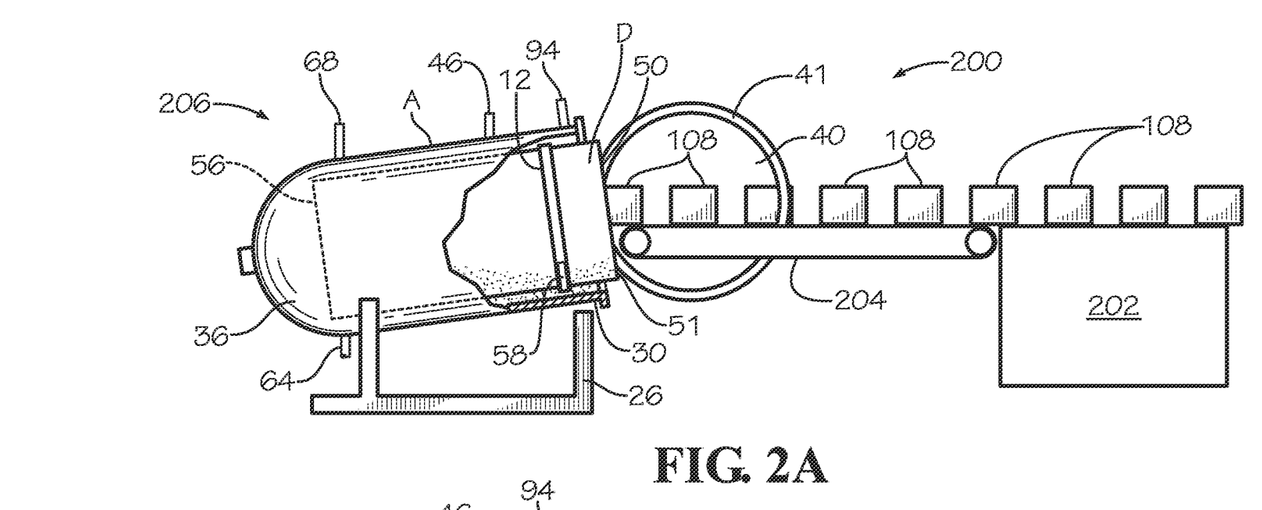
FIG. 2a is a schematic illustration of a waste material recycling system receiving baled waste material according to an embodiment of this invention.
Figure 2B:
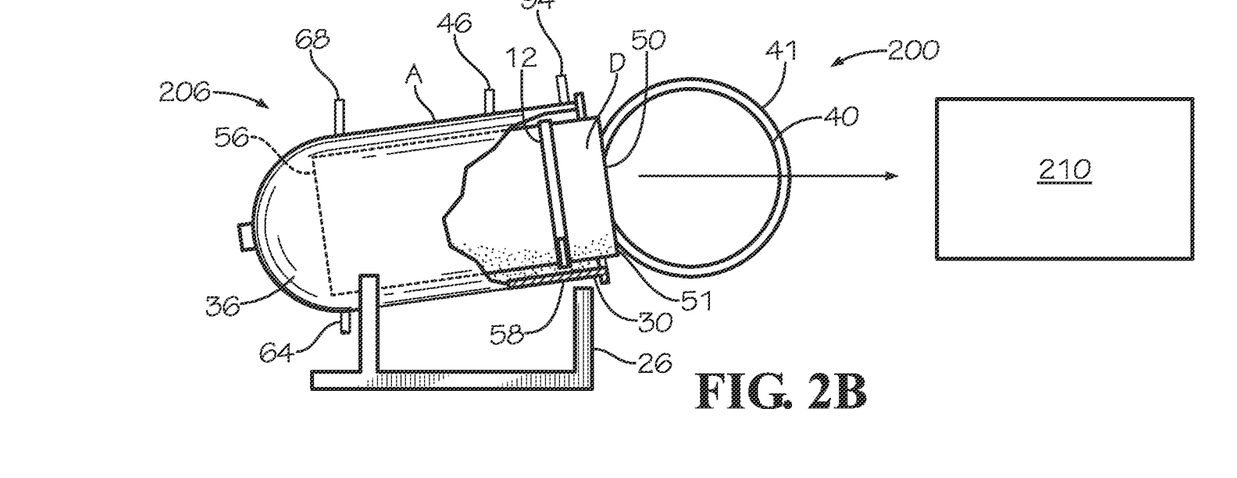
FIG. 2b is a schematic illustration of a waste material recycling system discharging treated waste material according to an embodiment of this invention.

According to embodiments of the invention, a waste material recycling system 200 is schematically illustrated in FIGS. 2a and 2b. According to an embodiment of this invention, suitable recycling locations include pulp and paper mills and the like where there is local need for the re-pulp fiber produced as well as some other of the recycled materials. As shown in FIG. 2a, the waste material recycling system 200 includes a receiving platform 202 for receiving the plastic-wrapped waste material bales 108 from a truck or other transportation container and a mechanism 204 such as a conveyor or grapple, or the like, for transporting the plastic-wrapped waste material bales from the platform to a waste material recycling autoclave 206. Treatment of the plastic-wrapped waste material bales 108 in the autoclave 206 is described in more detail herein below with reference to FIGS. 3-11. FIG. 2b, however, very generally illustrates that treated waste material 208 is discharged from the autoclave 206 and fed to subsequent recycling separation equipment 210 for further separation and sorting of the treated waste material.

The term "re-pulp" means to detach or at least partially separate from one another fibers that have been attached to, bonded with, or entangled with one another such as are cellulosic fibers in paper. In the context of this description, re-pulping paper means to at least partially separate cellulosic fibers of paper from one another to form a loose cellulosic fiber pulp.

According to an embodiment of this invention, a process is provided for recycling the plastic-wrapped baled compressed waste material, including waste paper and polymeric waste material such as plastic, utilizing an autoclave comprising a pressure vessel of generally cylindrical configuration mounted to be driven in inclined rotation about its longitudinal axis, said process comprising the steps of: a) introducing the plastic-wrapped baled compressed waste material and dilution water through an inlet of the pressure vessel; b) adding thermal energy to the waste material in the pressure vessel to impart an elevated processing temperature and an elevated processing pressure to the waste material inside the pressure vessel to a level above atmospheric pressure; c) rotating the pressure vessel about its longitudinal axis, so as to agitate and de-bale the waste material to accomplish re-pulping of the fibrous paper fraction; d) de-pressurizing the vessel by venting the steam through a condenser followed by pulling a vacuum on the condenser in order to begin the cooling of the material e) thereafter introducing cooling water into the pressure vessel so as to cool the treated waste material in the pressure vessel to a discharge temperature below that achievable in the previous step and reduce odor emitted by the treated waste material; and f) discharging the treated waste material from the pressure vessel, wherein said paper fraction is substantially re-pulped and substantially detached from said polymeric or plastic waste material and other contaminants in said waste materials.

According to yet another embodiment of this invention, a process is provided wherein a rotating apparatus referred to in the art as a Rotoclave® apparatus (available from Tempico, Inc., Madisonville, La., USA) is used. A desired amount of plastic-wrapped baled compressed waste material is placed into a drum of the rotoclave by allowing rotational motion of augered vanes in the drum to draw the waste material into a chamber of the drum. The waste material includes waste paper and one or more odorous compounds or material that forms one or more odorous compounds during re-pulping. The pressure vessel door is closed and sealed, dilution water is added, and a vacuum is drawn in the chamber to eliminate the effects of the partial pressure of air trapped in the vessel. The rotoclave chamber is then isolated and steam is introduced through a steam inlet valve until the desired processing temperature and pressure are reached. The rotoclave drum is rotated while the waste material is contained in the drum at the desired processing temperature and pressure for a preset reaction time to form a treated waste material. Steam is used to maintain the temperature and pressure throughout the preset reaction time. After the preset reaction time, a steam valve for introducing the steam into the drum is closed and the drum is vented to atmospheric pressure, which, in turn, also reduces the temperature in the chamber. Following the first venting step, a vacuum is drawn to further reduce the temperature of the treated waste material. The drum is then vented to the atmosphere again and a cooling water is thereafter introduced into the chamber to further cool the treated waste material to a discharge temperature and dilute the one or more odorous compounds and the chamber is opened. The treated material inside the drum is then removed by reversing the drum rotation so that the auger vanes deliver the treated material to the front of the drum where it then exits onto a discharge conveyor for further screening to remove the coarse material.

Pressure Vessel

In accordance with an embodiment of this invention, the autoclave pressure vessel generally may be an elongated vessel of cylindrical configuration mounted to be driven in rotation about its longitudinal axis, the vessel having an inlet at one end and an outlet at the other end, and is provided with agitating means including an array of fixed lifting paddles present in the interior of said vessel. The agitation of the waste materials may comprise the action of the lifting paddles in the vessel, concurrent with rotation of said vessel. In accordance with an embodiment of this invention, the vessel may be provided with a helically configured member.

Any suitable pressure vessel that can bring about the needed effects in processing the waste material of this invention may be employed in connection with this invention. According to an embodiment of this invention, however, the pressure vessel may be equipped advantageously with suitable agitating means to facilitate proper agitation of the waste material. A suitable pressure vessel in accordance with an embodiment of this invention is a pressure vessel of generally cylindrical configuration mounted to be driven in inclined rotation about its longitudinal axis as disclosed in U.S. Pat. Nos. 5,119,994; 4,974,781; and 6,458,240, and U.S. patent application Ser. No. 14/256,652 filed with the U.S. Patent Office on Apr. 14, 2014 and entitled "Method For Recycling Waste Material With Reduced Odor Emission," the disclosures of which are incorporated herein by reference in their entirety. Such a pressure vessel is equipped with suitable means for agitation to uniformly mix the waste material and break up the plastic-containing and paper-containing waste materials. Examples of suitable agitating means include mechanical, hydromechanical or electrical devices. Specific examples of mechanical devices include mechanical stirrers, shakers, blenders, tumblers, and the like. It has been found that an array of fixed lifting paddles and a helically configured member mounted in an interior section of a pressure vessel cooperate as one example of agitating means for an embodiment of this invention. According to an embodiment, the agitating means is provided within a drum, which is rotatably mounted at an incline inside a pressure vessel.

Thus, an autoclave for treatment of plastic-wrapped waste material bales in accordance with an embodiment of this invention involves the generally cylindrical vessel mounted at a slight angle of incline with respect to the horizontal plane, with the angle of incline being of an embodiment of about 7°, the upper end of the vessel having an opening to receive waste material and the lower end of the vessel being closed. The vessel may be designed with a highly effective closure device on the opening that, when closed, seals the vessel from the atmosphere to allow a buildup of pressure to occur within the vessel during its operation, or, alternatively, permit a vacuum to be maintained within the vessel by the functioning of an appropriate vacuum system.

As the drum is rotated in accordance with an embodiment of this invention, the waste material in the drum is believed to be tumbled in contact with the sidewall of the drum, a distance equal to the angle of repose of the materials times the coefficient of friction of the materials times the rate of rotation of the drum. According to an embodiment, the angle of repose of the treated material is approximately 45° and the coefficient of friction is approximately 0.2.

Referring to FIGS. 3-11, there is shown an autoclave for practicing a process in accordance with an embodiment of the present invention as disclosed in U.S. Pat. No. 6,458, 240. The apparatus includes a heavy walled processing pressure vessel A that is generally cylindrical in configuration. Heavy walls are used in the construction of the pressure vessel A in order that it can operate under conditions of high internal pressure as well as on occasion, under vacuum conditions as noted above. The pressure vessel A is mounted in a non-rotatable manner on a sturdy stationary support 26 and has a sufficiently wide base as to give ample stability. The support 26 may utilize structural steel members designed to effectively transfer the weight of the processor and its contained plastic-wrapped waste material bales to the foundation under the processor.

Figure 3:
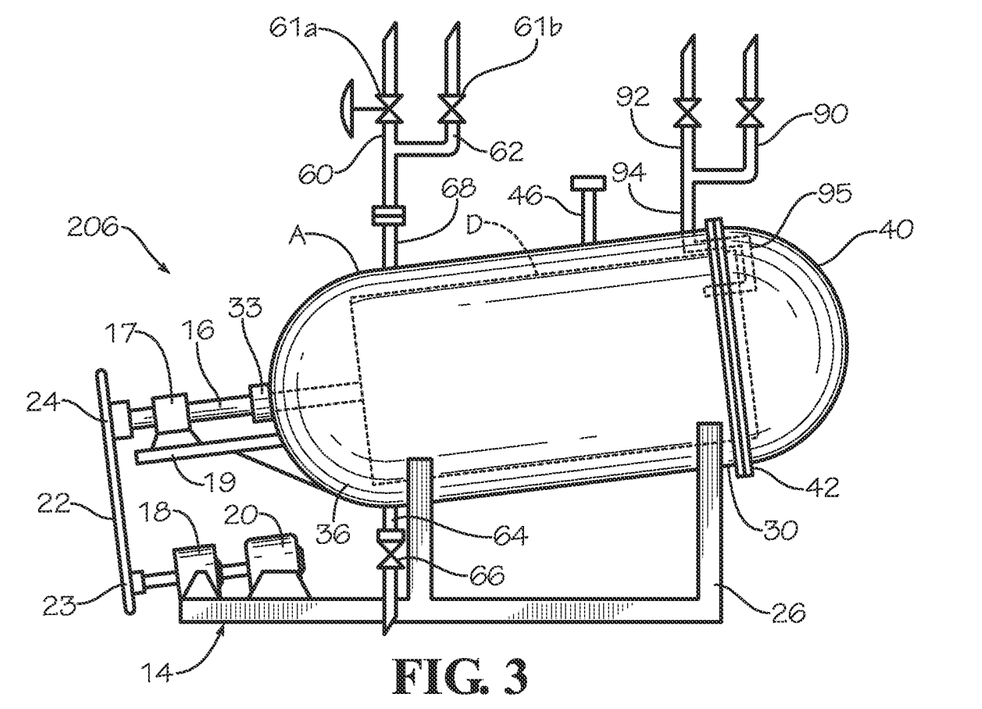
FIG. 3 is a side elevational view of an autoclave re-pulping device used in an embodiment of this invention.

The rotating drum about to be described, that is utilized within the shell of the vessel A, transfers its forces to carrier and support bearings, which in turn transfer that load into the shell of the vessel A and become a part of the load supported by the structural supports of the shell, and thus transferred to the foundation below the processor.

Figure 4:
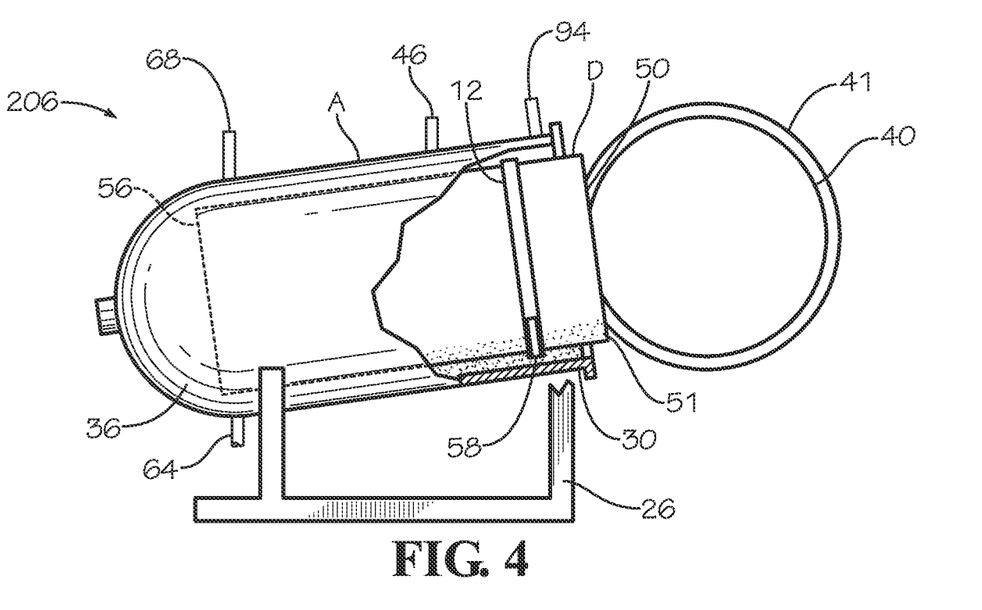
FIG. 4 is a view of the vessel of FIG. 3, in partial section, showing the rotating drum, and showing the autoclave's closure panel in the open position.

A closure device or dome shaped door 40, provided with a seal 41, is hingedly mounted adjacent the inlet 30 of the vessel A so that substantial pressure or a vacuum can be established inside the vessel at selected times, as mentioned previously.

Located inside the non-rotating vessel A is a generally cylindrical drum D mounted so as to be rotatable in either direction on its axis, which axis is coincident with the axis of the vessel A. Drum D is provided with a riding ring or support ring 12 adjacent to its front end 50, with rollers or trunnion bearings 58 being positioned on the interior of vessel A to contact the ring 12, and thus provide support for the front end 50 of the drum D. The front end 50 of the drum D is open, whereas the rear or lower end 56 of the drum is closed and watertight.

Affixed to the rear or lower end 56 of the drum D is drive shaft 16, which is arranged to support the rear end of the drum D and drive it in rotation. The shaft is rotatably supported by roller or ball bearings 17 that are in turn supported from a structural member 19 attached to the vessel A. This support arrangement is designed to fix the location of the drum D insofar as its horizontal positioning within the vessel A is concerned.

The drive shaft 16 of the drum D penetrates the shell of the vessel A and is sealed from the atmosphere by a seal 33 to enable a selected pressure or a selected vacuum to be maintained from time to time within the vessel A, and of course within the drum D.

The typical rate of rotation for the drum D is between 2 and 30 rpm and preferably approximately 8-15 rpm to facilitate a uniform loading of forces on the drive mechanism 14 utilized for driving the drum in rotation.

Figure 5:
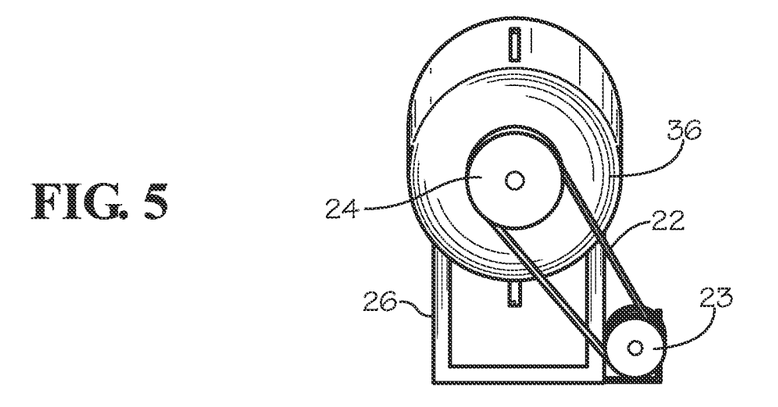
FIG. 5 is an end view in elevation of the pressure vessel of FIG. 3; this view showing the drive belt and motor used for driving the drum in rotation.
Figure 6:
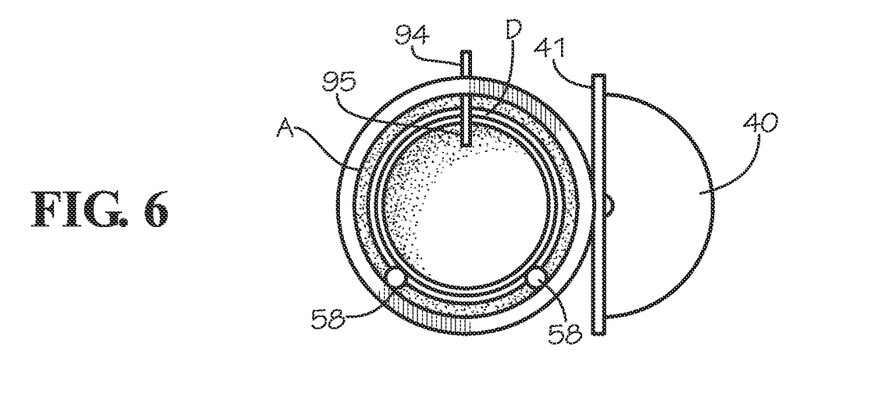
FIG. 6 is an end view of the autoclave of FIG. 3, illustrating operation of the closure panel.

The drum D is capable of being rotated in either direction on its horizontal axis by means of the drive assembly 14 depicted in FIG. 3 that may, for example, utilize a reversible electric motor 20 and suitable reduction gearing 18 connected to the drive shaft 16 of the drum to turn the drum D in the selected direction. It is preferable to use a heavy duty chain 22 passing over sprockets 23 and 24 for transferring the rotation of the motor to the drive shaft, in an arrangement familiar to those knowledgeable in the art, as depicted in FIGS. 3 and 5.

By placing the drum D within the pressure vessel A, it is possible to have the same advantages of unobstructed agitation of materials as it would have had in a free-standing rotatable drum. By designing the drum to have adequate containing walls, the plastic-wrapped waste material bales that are being processed and any additives to be inserted into those materials are contained within the drum during processing. Because, in accordance with this embodiment, the drum is disposed within a pressure vessel, the materials of construction of the drum are considerably lighter than are required for a free-standing, rotatable drum, which would have required the structural integrity to withstand the forces of pressure as well as the forces associated with the vacuum that will be utilized from time to time in the process.

The interior of drum D is equipped with a series of lifting paddles 70 and a helical flighting 80 to facilitate agitation and movement of waste materials as a consequence of rotation of the drum D. The lifting paddles used for the instant invention and the flighting are described in more detail below.

Vessel A, in accordance with this invention, is preferably operated on an incline. One suitable angle of incline is 7° from the horizontal, with the front or inlet end 30 being higher than the closed lower end 36 of the vessel. The angle of incline aids in containing the waste materials to be processed within the drum D in that the waste materials will be moved through the drum D toward the back end, at least partly under the influence of gravity as the drum is rotated.

Although there is no limitation for the size of drum D, it is to be noted that a device utilizing a drum approximately ten feet long is of a size that can be effectively utilized in a recycling station. In other words, a smaller sized version of a waste processor in accordance with this invention could take the form of a unit that could be placed within a relatively limited area, to handle smaller scale any special type waste materials generated therein.

At the same time, it is obviously possible to use larger units to perform large scale operations, and by the foregoing mention of a processor of a size to be used in a disposal facility is not intended to limit the largeness or smallness of any processor, except that the diameter of the vessel should be sufficiently large as to accept materials upon which a prior size reduction has not taken place. Any combination of reasonable diameters and lengths could be utilized in accordance with this invention, limited only by practicality.

Returning to the details of this invention, the lifting paddles 70 are mounted on the interior of the drum D and are arranged so as to minimize any obstruction of flow of materials within the drum. The lifting paddles are distributed in sections along the horizontal dimension of the drum, as shown in FIG. 7, and are staggered at approximately 45° intervals from one section to the next.

Figure 7:
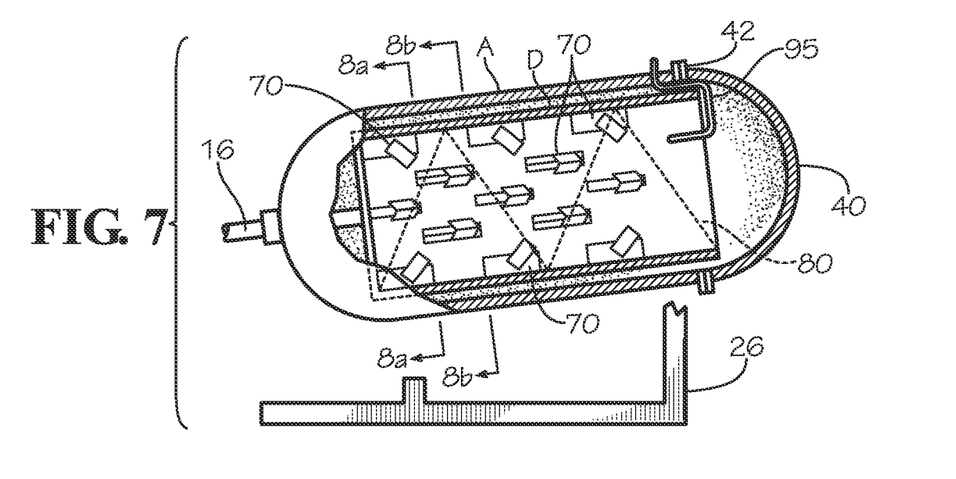
FIG. 7 is a side elevational view of the apparatus of FIG. 3, in partial section, showing lifting paddles disposed in a spaced array around the interior of the rotating drum, with the location of a helical baffle being indicated by the use of dashed lines.
Figure 8A:
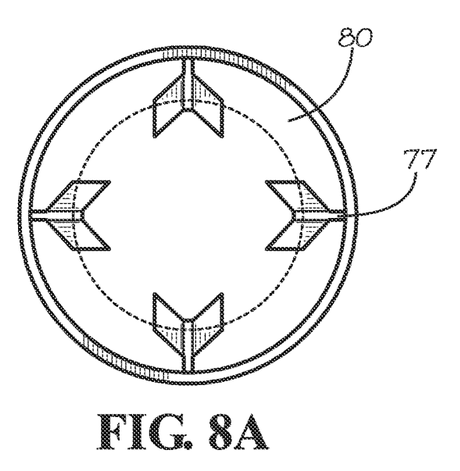
FIG. 8a is a cross sectional view taken along lines 8a-8a of FIG. 7.
Figure 8B:
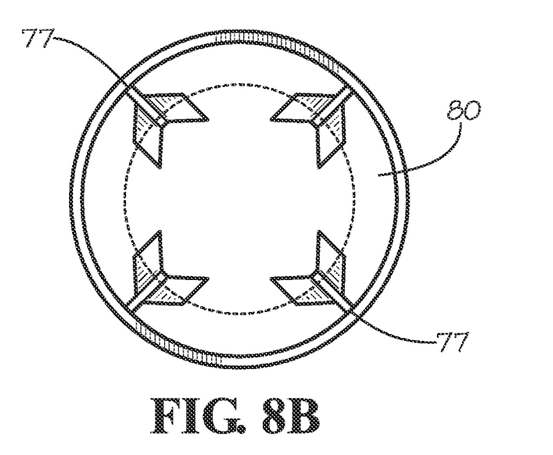
FIG. 8b is a cross sectional view taken along lines 8b-8b of FIG. 7.
Figure 9:
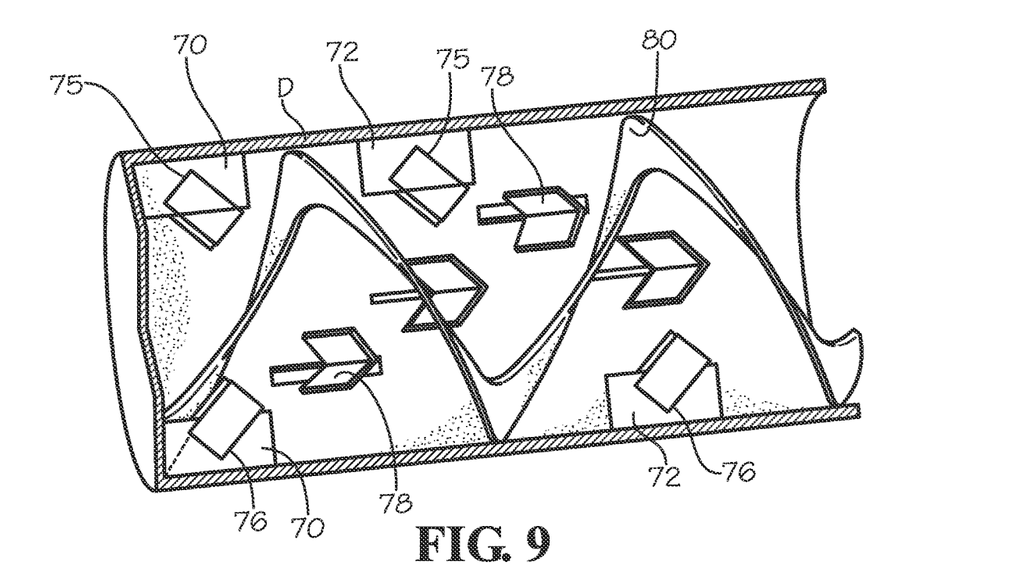
FIG. 9 indicates the relationship of the lifting paddles to the helical baffle disposed around the interior surface of the rotating drum of FIGS. 3-8b.

The lifting paddles 70 are affixed to the interior perimeter of the drum D perpendicular to the shell of the drum, as shown in FIGS. 8*a* and 8*b*, and are oriented lengthwise to correspond with the longitudinal dimension of the drum, as is shown in FIGS. 7 and 9.

Figure 10:
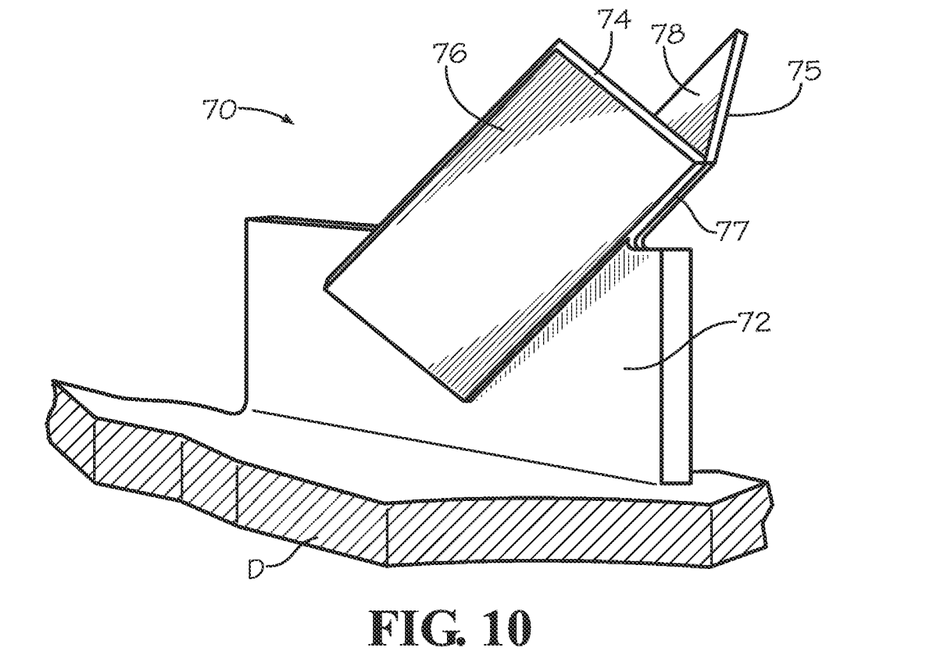
FIG. 10 is an enlarged scale drawing of a typical lifting paddle utilized in connection with an embodiment of this invention, also showing an adjacent portion of the drum in cross section, the closure panel end of the drum being toward the left as viewed in this figure.

As best seen in FIG. 10, the perpendicular leg 72 is affixed to the interior sidewall of the drum, and the angled member 74 is affixed at its midline 77 to the radially inner portion of the perpendicular leg. The angled member 74 has external surfaces 75 and 76, with surface 75 being at an angle of approximately 45° from the perpendicular leg 72 of the lifting paddle, and surface 76 being at a like angle to the leg 72. The surfaces 76 are preferably considered as the first portions, and the surfaces 75 of the paddles are considered as the second portions. The midline 77 of the angled member 74 may be at an angle of approximately 52° with respect to the interior surface of the drum D, and as shown in FIG. 10, the midline 77 is placed in a direction that is toward the higher end of the drum D. Stated somewhat differently, the interior portions 78 of the lifting paddles face the closed end 56 of the drum D, which is to the left as viewed from the perspective of FIG. 10.

In an embodiment, the angle of incline of the drum is about 7° with respect to the horizontal, so the angle of incline of the angular portions 75 and 76 of the lifting paddle is 52° with respect to the shell wall of the drum D, and this results in the angular portions 75 and 76 of the lifting paddle operating at an angle of 45° with respect to the horizontal.

The helical flighting or baffle 80 is affixed to the interior perimeter of the drum D so as to minimize obstruction of flow of waste material within the drum, and may be at a frequency corresponding to one complete cycle of the helix in a distance equal to the diameter of the drum, measured along the length of the drum. The angularity of the helical flighting is such that when the drum D is rotated in what is called the first rotative direction, the waste material to be processed is moved forward, toward the closed lower end 56 of the drum, whereas rotation of the drum in the second rotative direction causes the materials to be moved backward toward the inlet opening 50 of the drum. The helical flighting is continuous, meaning that occasional lifting paddles 70 must be eliminated at certain locations in order to make fabrication possible.

The size and frequency of the lifting paddles, the angle of incline of the drum and the rate of rotation of the drum are variable and are a function of the required rate of movement of materials within the drum and the amount of material to be processed in a given amount of time.

The diameter of the drum may be sufficient to accept a selected quantity of waste material to be processed, with an additional space of approximately 40 percent of the volume of the interior diameter of the drum needed to remain vacant to allow materials to fall and to mix within the drum as it rotates. In a design of this type of device, additional processing capacity is added to the processor by increasing its length. The ratio of diameter to length is variable and depends upon the amount of material to be processed in a given amount of time in concert with the size and frequency of the agitation mechanisms of the drum to insure complete mixing of waste material and water.

Devices for monitoring and controlling the process include, for example, water piping, steam piping, vacuum piping, pressure controllers and other needed instruments. In using a free-standing, rotatable drum, each of these devices may be affixed to the centerline of the axis of rotation of the rotatable drum, which complicates the closure devices on such a vessel and, by necessity, places these devices at the ends of the drum. In the case of pressure controllers, vacuum connections and temperature controlling instruments, this is not an appropriate location. Rather, devices of this type may better monitor and control the process from a location that is nearer to the point in the process where the reaction is taking place, and not adjacent to or at the opposite end of the injection of additives to the process. Thus, some embodiments utilize a pressure vessel in which a rotating drum is utilized.

Inducing pressure and vacuum further complicates the utilization of a free-standing, rotating drum. Vacuum, in particular, requires that the device have considerable strength to keep from collapsing, and this generally equates to massive components, requiring considerable horsepower if such components are to be driven in rotation.

Additionally, introducing plastic-wrapped waste material bales may require that the closure device be of large size. Because of their large size and because of the pressure and vacuum conditions of the process, the closure devices would be very difficult to handle manually. Automatic closure device operators that would be affixed to a free-standing, rotating drum can be complicated. In this embodiment, the drum is rotated for a time period during which the closure device is open, and thus, the closure device and its operator must not interfere with the ability of the drum to rotate under these circumstances.

With reference to FIG. 3, the vessel A is equipped with piping 90 for the selective addition of steam and piping 92 for the selective addition of both dilution and cooling water, with suitable valves being utilized in order to control the flow. The steam piping and the water piping are combined into a single injection pipe 94 as shown in FIG. 3, enabling steam and water to be conducted through the sidewall of the vessel A and then injected into the open end of the drum D, through curved fixed pipe 95.

Figure 11:
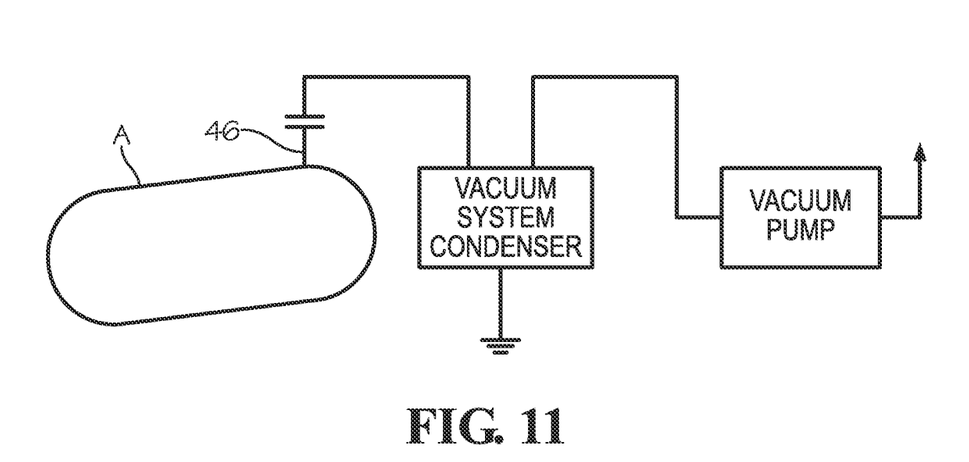
FIG. 11 is a schematic of a vacuum system used in connection with an embodiment of this invention.

During one phase of the operation of the device, vacuum is induced into the vessel A by a vacuum system such as the type manufactured by Nash Engineering Company of Norwalk, Conn. or Croll-Reynolds Company, Inc. of Westfield, N.J., connected to the vessel by vacuum connection 46; note FIG. 11.

Waste Material Introduction

As described hereinabove, in accordance with an embodiment of this invention, suitable waste materials includes plastic-wrapped compressed baled waste material such as municipal solid waste or commercial solid waste.

Referring back to FIGS. 3-11 and in accordance with an embodiment of this invention, plastic-wrapped waste material bales are carried by a suitable conveyor and introduced through the inlet opening 30, when the door 40 has been moved to the open position, and into the open end 50 of the drum D. The inlet opening 30 in the vessel A and the opening 50 into the drum are large enough and without obstructions so as to allow plastic-wrapped waste material bales to be directly introduced into the processor.

The drum D is rotated in the first rotative direction while the plastic-wrapped waste material bales are being conveyed into the drum and, by virtue of the helical flighting 80 and the angle of incline of the drum, a sufficient amount of the plastic-wrapped waste material bales will be loaded into the drum for processing.

When the drum D has been filled with a sufficient amount of plastic-wrapped waste material bales to be processed, the closure device 40 is closed and is secured by a locking ring 42, such as the type manufactured by the Klinge Products Company of Denmark.

Dilution Water

Turning back to the embodiment illustrated in FIGS. 3-11, a substantial amount of dilution water is added to the waste material to be processed, this being accomplished by injecting dilution water through pipe 92, such that sufficient dilution water is brought into contact with the waste material in the drum, via the curved stationary pipe 95. Dilution water is usually added to the pressure vessel drum D to accomplish water content in the drum D of between 30 percent and 75 percent by weight of total waste material and water in the drum, with approximately 70 percent being the amount in accordance with a particular embodiment. In accordance with another embodiment, the dilution water is introduced into the pressure vessel drum D through pipe 92 in an amount up to about 3 parts by weight dilution water to about 1 part by weight waste material, or an amount up to about 7 parts by weight dilution water to about 3 parts by weight waste material, or an amount from about 0.43 parts to about 3 parts by weight dilution water to about 1 part by weight waste material.

In accordance with embodiments of the invention, the dilution water may be substantially pure water, but may be potable or non-potable water. The dilution water may contain additives such as chemical aids described in more detail below.

The drum D is ordinarily rotated in the first rotative direction during the dilution water addition to enhance the contact of the waste materials with the dilution water.

Once all of the plastic-wrapped waste material bales are loaded into the vessel, the pressure vessel door is closed and sealed. The drum D is then rotated in the first rotative direction, during which a vacuum may be drawn in the chamber for a short period, about one to five minutes or five to ten minutes. One of the purposes of applying a vacuum at this stage is to prevent the buildup of pressure by the trapped non condensable gasses. At the end of the vacuum draw period, the vacuum is shut off and the system is isolated by closing the valve. After the vacuum draw period is complete, the dilution water is added to the drum D chamber.

Chemical Aids

In accordance with the embodiments of the invention, addition of suitable chemical aids during the agitation process may improve the quality of the pulped paper fraction. The extent of re-pulping may increase from the use of chemical aids. In addition, the pulp formed in the presence of certain chemical aids may be brighter and could reduce the extent of additional process steps. The chemical aid may be introduced into the pressure vessel before or after the drum door has been closed and locked and may be added to the pressure vessel before, with or after the waste material, or with the dilution water.

Thus in accordance with an embodiment of this invention, there may optionally be included at least one chemical aid selected from the group consisting of alkaline agent, buffer, bleaching agent, detergents, surfactants, solvents, dispersants, chelating agents, sequestrants, and mixtures thereof. These chemical aids either alone or in combination thereof may be used in their bulk form or in solution, preferably as solutions in water. Any amount of these chemical aids may be used to bring about the intended benefit; however, the preferred chemical aids and amounts are described in more detail below.

In accordance with some embodiments of this invention, various other chemical aids such as detergents, surfactants, solvents, dispersants, chelating agents, sequestrants either alone or in combination thereof may be added to the waste material for use during re-pulping. All of these chemical aids now known or hereinafter developed for such purpose may be used in quantities sufficient to bring about the intended benefit. However, these chemical aids are used only if the pulp formed therefrom exhibits acceptable qualities.

In accordance with some embodiments of this invention, the preferred chemical aids are sodium hydroxide alone or in combination with hydrogen peroxide.

Re-Pulping Conditions

In accordance with embodiments of this invention, the processing of the waste material, which includes waste paper, is accomplished with the addition of heat and mechanical energy to sufficiently re-pulp and incidentally to sterilize the waste material. By virtue of the added dilution water, which increases the conduction of heat into the waste material being processed, waste materials that might otherwise produce an insulating effect for themselves and on other materials are completely and quickly penetrated by the required heat, thus avoiding the creation of pockets in which infectious materials could be protected from sufficient heat to accomplish complete re-pulping. Because of the reduction in size of the pulpable fractions of the wastes as they are processed, as previously described, and because the heat of the process causes the plastic fractions of the wastes when present to become heat distorted and to collapse into more compact forms, the entire amount of the waste is more completely agitated and therefore most completely contacted by the heat.

Turning back to the embodiment illustrated in FIGS. 3-11, in the first rotative direction, assumed to be clockwise when viewed from the open end of the drum, waste material is intercepted by the directional flighting 80 and is moved through the drum toward the back or closed lower end 56 of the drum. Simultaneously, the bi-directional lifting paddles 70, by virtue of the angular portion of each paddle, direct a portion of the waste material counter-currently toward the inlet end of the drum as each of the paddles comes in contact with the material during the rotation of the drum. This simultaneous backward and forward movement of materials within the drum by the action of the helical flighting 80 and the surfaces 76 of the novel lifting paddles 70 during the rotation of the drum D in the desired direction results in an advantageous and a very complete agitation of the materials being processed. Because of these actions and the added dilution water, the re-pulping of the pulpable materials of the waste materials is very effectively accomplished. The plastic-wrapped waste material bales are completely de-baled in this process.

In some embodiments, the rotating drum apparatus is rotated at a speed of at least about 6 revolutions per minute (rpm), or at least about 8 revolutions per minute (rpm), or at least about 10 rpm.

In accordance with some embodiments of this invention, heat is added to the pressure vessel during the processing of the waste materials. In this case, steam may be advantageously added to the vessel by steam piping 90 and injected into the waste materials by injection piping 94 while the drum is being rotated in the first rotative direction; note FIG. 3. As previously described the addition of heat causes plastic materials when present to become softened and to separate while the drum is being rotated, thus allowing the paper fraction that is in close contact with plastic to be completely agitated and contacted with the added moisture and added heat. Desired pressure is maintained in the vessel A by suitable use of the valves of the pressure control system associated with the pressure pipe 60 and the vent connection 62. Valve 61a controls the pressure pipe 60, and valve 61b the vent pipe 62. Pipe 68 forms the connection to the interior of vessel A. The chemical aid as described previously can be additionally added as a liquid or a vapor into the steam line, or alternatively into the water line.

In accordance with some embodiments, a sufficient amount of steam is introduced during the agitation step so as to bring about internal temperature in the range of about 212° F. to about 285° F. and pressure in the range of about 0 psig up to about 50 psig or in the range of about 10 psig to about 50 psig. In accordance with some embodiments, a temperature of at least about 230° F. and a pressure of at least about 15 psig to reduce the time required to accomplish pulping is preferred.

In accordance with some embodiments, conditions are controlled so that the time required to accomplish re-pulping is generally from about 30 to 90 minutes, and typically the time required to accomplish re-pulping may be about 60 minutes.

In an embodiment where a sufficient amount of steam is introduced during the agitation step so as to bring about an internal temperature of about 275° F. and a pressure of about 30 psig to reduce the time required to accomplish re-pulping which may be about 40 to 80 minutes in some cases; again, the time required to accomplish pulping is typically about 60 minutes or less. In some embodiments, at least about 80 percent of the paper is re-pulped, and in some embodiments, at least 90 percent of the paper is re-pulped. In some embodiments, at least 65 percent of the paper present is re-pulped.

In accordance with some embodiments, the waste material is held at a temperature of at least about 212° F. for a period of at least about 90 minutes during the re-pulping step, at a pressure of approximately 15 psig, or at a temperature of about 285° F. for a period of at least 40 minutes, at a pressure of approximately 50 psig, or other combinations of pressure, temperature and time as have been shown to accomplish complete and effective re-pulping of contaminated waste. In accordance with some embodiments, a sufficient amount of steam is introduced into the pressure vessel during drum rotation while the waste material is being agitated so as to bring about an internal temperature of about 230° F. and a pressure of about 18 psig to reduce the time required to accomplish re-pulping, which time is about 40 to 60 minutes, or 60 minutes. In accordance with other embodiments, the internal temperature is about 275° F. at a pressure of about 45 psig, the time to accomplish re-pulping being about 40 to 80 minutes, or about 60 minutes.

Post Re-Pulping Pressure Reduction

After the waste materials have been processed for a sufficient amount of time at a sufficiently high temperature, the steam injection to the system is shut off, the pressure vessel drum is vented to atmospheric pressure, and then the vacuum system 46 depicted in FIG. 11 is turned on while continuing to rotate the drum in the first rotative direction to induce a vacuum in the pressure vessel chamber to cool the treated waste material in the pressure vessel. As the vacuum is induced, the treated waste materials are cooled from the re-pulping processing temperature to a lower temperature. In accordance with some embodiments, the vacuum induced ranges from about −5 psig to about −15 psig or about −10 psig and reduces the temperature of the treated material to as low as about 170° F. or about 160° F. or as low as about 150° F.

Cooling Water

Cooling water is introduced into the pressure vessel to continue to cool the treated waste material in the pressure vessel to a discharge temperature below the elevated re-pulping processing temperature and to reduce odor emitted by the treated waste material. The addition of the cooling water reduces or eliminates odor that is or would otherwise be emitted when the treated waste material is discharged. Water and the treated waste material in the pressure vessel form a treated waste material slurry in the pressure vessel. While not wishing to be bound by theory, it is believed that the cooling water reduces the odor by reducing the temperature of the treated material or diluting the treated material slurry or both. It is also believed that the cooling water absorbs odorous compounds in the treated material that would otherwise be released into the surrounding atmosphere. Such odorous compounds may be present in the waste material or are produced during re-pulping of the treated waste material slurry or both. In some embodiments of this invention, sources of odorous compounds include food or beverage waste or both.

Turning back to the embodiment illustrated in FIGS. 3-11, an amount of cooling water is added to the treated waste material, this being accomplished by injecting cooling water through pipe 92, such that sufficient cooling water is brought into contact with the waste material in the drum D, via the curved stationary pipe 95. Cooling water is added to the pressure vessel drum D to accomplish total water content in the drum D of between 78 percent and 95 percent by weight of total waste material and water in the drum, with approximately 80 percent being the amount in accordance with a particular embodiment. In accordance with another embodiment, the cooling water is introduced into the pressure vessel drum D through pipe 92 in an amount such that a total amount of water present in the pressure vessel after the cooling step is at least about 3.5 parts by weight to about 1 part by weight treated waste material or at least about 3.8 parts by weight to about 1 part by weight treated waste material.

In accordance with embodiments of this invention, the cooling water is added to the treated waste material in an amount sufficient to reduce the temperature of the treated waste material in the pressure vessel by at least about 10° F., or by about 10° F. to about 50° F., or about 10° F. to about 30° F. In accordance with embodiments of this invention, the cooling water is added to the treated waste material in an amount sufficient to reduce the temperature of the treated waste material in the pressure vessel from a temperature of at least about 170° F. to a temperature of no more than about 140° F., or from a temperature of at least about 160° F. to a temperature of no more than about 140° F., or from a temperature of at least about 160° F. to a temperature of no more than about 130° F.

In accordance with embodiments of this invention, the cooling water is added to the treated waste material at a temperature up to about 130° F., or up to about 120° F., or from about 70° F. to about 130° F., or from about 70° F. to about 120° F., or from about 70° F. to about 115° F.

In accordance with embodiments of this invention, the cooling water is added to the treated waste material in an amount sufficient to increase total water content in the pressure vessel by at least about 5% by weight of the total water and waste material content of the pressure vessel, or at least about 10% by weight of the total water and waste material content of the pressure vessel, or by about 5% to about 40% by weight of the total water and waste material content of the pressure vessel.

In accordance with embodiments of the invention, the cooling water may be substantially pure water, but may be potable or non-potable water. The cooling water may contain additives such as odor modifiers and/or biocides.

Discharging Treated Waste

After cooling with the cooling water, the materials are discharged from the rotating vessel for the recovery of the re-pulped materials for recycling. In accordance with some embodiments, the discharged pulp fraction contains solid concentration of about 5 weight percent to about 50 weight percent based on the total wet weight of the discharged pulp fraction. Preferably the solid concentration is in the range of about 10 weight percent to about 25 weight percent based on the total wet weight of the discharged pulp fraction.

Further, as stated hereinabove, the waste paper fraction is essentially re-pulped. In accordance with some embodiments, the waste paper is at least about 80 percent re-pulped, or the waste paper fraction is at least about 90 percent re-pulped.

Turning back to the embodiment in FIGS. 3-11, the closure device 40 is opened and the drum D is rotated in the second rotative direction. In the second rotative direction, assuming counter-clockwise rotation, the processed waste materials are intercepted by the helical flighting 80 and are directed toward the inlet end of the drum D by the action of the helical flighting 80. As the drum D continues to rotate, the processed materials are also lifted and directed toward the inlet end of the vessel by the surfaces 75 of the "Y" shaped lifting paddles 70, as previously described.

The angular surfaces 75 and 76, on each side of the perpendicular surface of the paddles, function in an equal manner in either rotative direction, assisted of course in each instance by the vertically disposed member 72.

It is to be noted that the lifting paddles 70 are functioning in a counter-current or refluxing manner with respect to the helical flighting 80 during processing, with the surfaces 76 serving in a primary manner at such time. Only after the waste materials have been fully processed the rotative direction of the drum D is reversed, so as to enable the helical flighting 80 to discharge the material out over the lip 51 of the drum into a suitable discharge system. At this time of discharge, the surfaces 75 of the paddles 70 serve in a primary manner, in effect cooperating with the action of the helical flighting 80.

The processed materials are thus discharged from the vessel by the combined action of the helical flighting 80 and the surfaces 72 and 75 of the lifting paddles 70 during the rotation of the drum D in the second rotative direction. Because the outer lip 51 of the drum D protrudes beyond the outer rim of the vessel A, the discharged processed materials fall clear of the vessel. By virtue of the re-pulping of the paper materials, the volume of the processed waste material is reduced to approximately ⅓ of its original volume.

The rate of discharge of the processed materials, as is apparent to those skilled in the art, is dependent on the rate of rotation of the drum D, the size and frequency of the helical flighting 80, and the size and number of the lifting paddles 70 and these variables are dependent on the amount of material to be processed in a given amount of time and are not limited to a single combination of these variables.

Drain connection 64 is equipped with a suitable valve 66, which can be opened to enable moisture to be drained from the shell (pressure vessel A) upon excess accumulation thereof.

The processed materials are then directed to screens for the separation and recovery of the re-pulped paper fraction and further to collect the separated plastic materials. As described previously, the re-pulped paper fraction can then be subjected to further processing steps to form recycled paper sheet, tissue or board.

Recycled Paper Products

In some embodiments of the process of this invention, the re-pulped paper fraction is further subjected to a subsequent processing step to produce a paper product. In some embodiments, the paper product is either a paper tissue or a paper towel product. In some embodiments, the inventive process further includes utilizing the re-pulped paper fraction of the waste for the production of a recycle fiber-containing paper product such as recycle fiber-containing paperboard suitable for making paper plates, or recycle fiber-containing absorbent paper sheet, or recycle fiber-containing paper tissue, or recycle fiber-containing paper towel, or newsprint paper, or recycle fiber-containing cardboard product, including recycle fiber-containing corrugated cardboard paper product. So also, recycle fiber-containing writing paper is readily prepared.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended disclosure.

We claim:

1. A method to facilitate recycling of waste material including waste paper and organic material, comprising the steps of:
   receiving a plurality of plastic-wrapped compressed bales of the waste material, including paper and organic waste, at a waste material recycling location from a remote baling location;
   thereafter introducing the plurality of plastic-wrapped compressed bales into a re-pulping device at the waste material recycling location;
   re-pulping the waste paper in the re-pulping device to form a treated waste material including substantially re-pulped waste paper, wherein the re-pulping device is an autoclave and the re-pulping is carried out at an elevated processing temperature in a range of about 212° F. to about 255° F. and an elevated processing pressure above atmospheric pressure such that the re-pulped waste paper is suitable for making a paper product; and
   thereafter discharging the treated waste material from the re-pulping device.

2. The method of claim 1 further comprising the steps of baling the waste material into a plurality of plastic-wrapped compressed bales at the remote baling location and transporting the plastic-wrapped compressed bales from the remote baling location to the waste material recycling location.

3. The method of claim 1 wherein the plurality of plastic-wrapped compressed bales include one or more odor reducing or modifying chemicals added to the waste material.

4. The method of claim 1 wherein the treated waste material includes odorous compounds.

5. The method of claim 4 wherein the plurality of bales are wrapped in plastic film so as to substantially prevent emission of odor from the odorous compounds in the waste material or substantially stop formation of odor from the odorous compounds in the waste material or both.

6. The method of claim 1 wherein the waste material comprises organic material that includes odorous compounds or, when stored, is capable of forming odorous compounds.

7. The method of claim 6 wherein the organic material comprises waste food, waste beverage, or both.

8. The method of claim 1 wherein the waste material is municipal solid waste.

9. The method of claim 1 wherein the waste material is industrial solid waste.

10. The method of claim 1 wherein the waste material is residential solid waste.

11. The method of claim 1 wherein the waste material is commercial solid waste.

12. The method of claim 1 wherein the waste material further comprises plastics or metals or both.

13. The method of claim 1 wherein plurality of bales are wrapped in plastic film.

14. The method of claim 13 wherein the plurality of bales are substantially hermetically sealed in the plastic film.

15. The method of claim 13 wherein the re-pulping step separates the plastic film from the plurality of plastic-wrapped compressed bales.

16. The method of claim 1 wherein the elevated processing pressure is at least about 5 psig and the discharge temperature is less than about 140° F.

17. The method of claim 16 wherein the step of introducing the plurality of plastic-wrapped compressed bales into the re-pulping device comprises introducing the plurality of plastic-wrapped compressed bales into the re-pulping device at least 7 days after the waste material is baled.

18. The method of claim 1 wherein the step of re-pulping includes agitating the waste material in the re-pulping device.

19. The method of claim 1 wherein the step of re-pulping includes introducing thermal energy into the autoclave to reach the elevated processing temperature and pressure within the pressure vessel.

20. The method of claim 1 wherein the step of re-pulping includes introducing steam into the autoclave to reach the elevated processing temperature and pressure within the autoclave.

21. The method of claim 1 wherein the waste material in the plurality of plastic-wrapped compressed bales has a sterilization or disinfection requirement that is less than if the waste material was not in plastic-wrapped compressed bales.

22. The method of claim 1 wherein the step of introducing the plurality of plastic-wrapped compressed bales into the re-pulping device comprises introducing the plurality of plastic-wrapped compressed bales into the autoclave at least 2 days after the waste material is baled.

23. The method of claim 1 wherein the step of introducing the plurality of plastic-wrapped compressed bales into the re-pulping device comprises introducing the plurality of plastic-wrapped compressed bales into the re-pulping device at least 3 days after the waste material is baled.

24. The method of claim 1 wherein the step of introducing the plurality of plastic-wrapped compressed bales into the re-pulping device comprises introducing the plurality of plastic-wrapped compressed bales into the re-pulping device at least 4 days after the waste material is baled.

25. The method of claim 1 wherein the step of introducing the plurality of plastic-wrapped compressed bales into the re-pulping device comprises introducing the plurality of plastic-wrapped compressed bales into the re-pulping device at least 5 days after the waste material is baled.

26. The method of claim 1 wherein the autoclave includes a rotatable drum for containing the plurality of plastic-wrapped compressed bales and the step of re-pulping comprises rotating the drum.

27. A method to facilitate recycling of waste material including waste paper and organic material, comprising the steps of:
    receiving a plurality of plastic-wrapped compressed bales of the waste material, including paper and organic waste, at a waste material recycling location from a remote baling location;
    thereafter introducing the plurality of plastic-wrapped compressed bales into a re-pulping device at the waste material recycling location;
    re-pulping the waste paper in the re-pulping device to form a treated waste material including substantially re-pulped waste paper, wherein the re-pulping device is an autoclave and the re-pulping is carried out at an elevated processing temperature in a range of about 212° F. to about 285° F. and an elevated processing pressure above atmospheric pressure such that the re-pulped waste paper is suitable for making a paper product;
    thereafter introducing cooling water into the re-pulping device so as to cool the treated waste material in the re-pulping device to a discharge temperature below the elevated re-pulping processing temperature and reduce odor emitted by the treated waste material; and
    thereafter discharging the treated waste material from the re-pulping device.

28. The method of claim 27 further comprising the steps of baling the waste material into a plurality of plastic-wrapped compressed bales at the remote baling location and transporting the plastic-wrapped compressed bales from the remote baling location to the waste material recycling location.

29. The method of claim 27 wherein the waste material comprises organic material that includes odorous compounds or, when stored, is capable of forming odorous compounds.

30. The method of claim 27 wherein the step of re-pulping includes introducing thermal energy into the autoclave to reach the elevated processing temperature and pressure within the pressure vessel.

31. The method of claim 27 wherein the step of re-pulping includes introducing steam into the autoclave to reach the elevated processing temperature and pressure within the autoclave.

* * * * *